C. McGINNISS.
Smut and Separator Machine.
No. 36,788.  Patented Oct. 28, 1862.
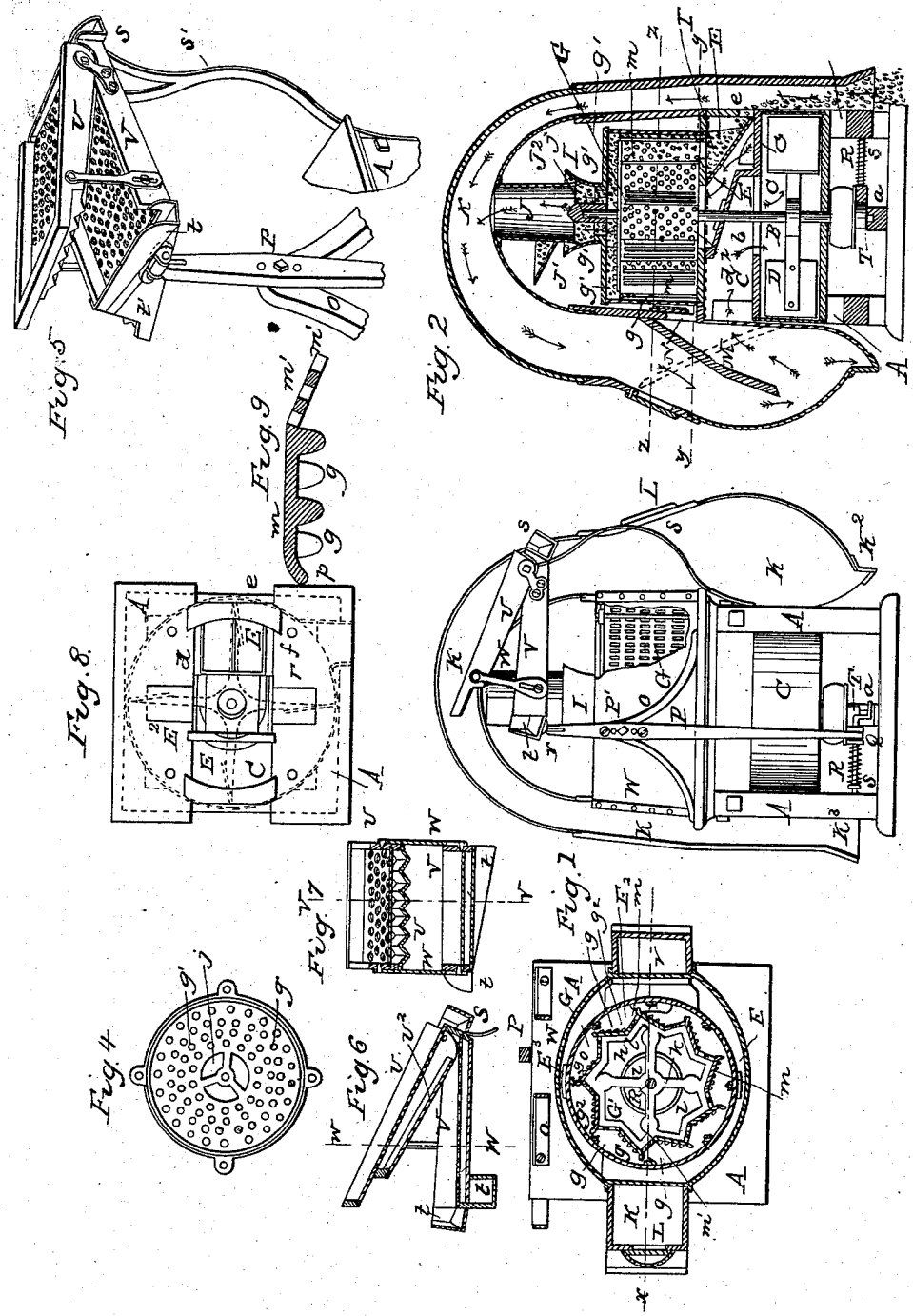
WITNESSES
INVENTOR

UNITED STATES PATENT OFFICE.

C. McGINNISS, OF CHICAGO, ILLINOIS.

IMPROVEMENT IN SMUT AND SEPARATOR MACHINES.

Specification forming part of Letters Patent No. 36,788, dated October 28, 1862.

*To all whom it may concern:*

Be it known that I, C. McGINNISS, of Chicago, in the county of Cook and State of Illinois, have invented a new and useful Improvement in Combined Smut Machine and Separator; and I do hereby declare that the following is a full, clear, and exact description of the same, reference being had to the accompanying drawings, forming part of this specification, in which—

Figure 1 is a side elevation of my improved machine. Fig. 2 is a vertical section in the line $x\,x$ of Fig. 3. Fig. 3 is a horizontal section on the line $z\,z$ of Fig. 2. Fig. 4 is an inverted plan of the top scouring-plate of the cylinder. Fig. 5 is a perspective view of the separating-sieves. Fig. 6 is a section of the sieves in the line $v\,v$ of Fig. 7. Fig. 7 is a section in the line $w\,w$ of Fig. 6. Fig. 8 is a horizontal section in the line $y\,y$ of Fig. 2. Fig. 9 is a broken horizontal section on a larger scale in the line $z\,z$ of Fig. 2.

Similar letters of reference in the several figures indicate corresponding parts.

My improvements relate, first, to the construction and arrangement of the shaker or screening attachment; second, to the smutting mechanism; and, third, to the blasting or screening arrangement.

To enable others skilled in the art to make and use my invention, I will proceed to describe its construction and operation with reference to the drawings.

A represents a rectangular or other shaped frame, containing or supporting all the machinery. Up through the center of the frame, from a step, $a$, a vertical shaft, B, extends a suitable distance. Around the lower portion of the shaft B a fan-case, C, is arranged, said case containing a fan, D, which is fastened upon the said lower portion of the shaft. The fan-case is of scroll form, and has an opening at one point of its circumference and in the center of its top, as at $b$.

Between the fan-case and the top of the frame A a space or channel for the wind and the grain to circulate through is constructed by boxing up the frame at three sides, as shown at $d\,e\,f$. In and about this channel four chutes, E E' E² E³, are arranged. The chute E conducts off the wheat, the chute E' directs the main portion of the blast of the fan upward, while the chutes E² E³ conduct smut, &c., into the fan.

On the top of the frame A and around the shaft B a perforated cylinder, G, is arranged. The inner circumference of this cylinder is provided with V-shaped vertical ribs $g$, which are roughened with projecting knobs $g'$, of approximate oval form, or of the shape illustrated in Fig. 9, similar-shaped projections $g'$ being formed on the under surface of the upper head of the cylinder. The lower head of the cylinder has a discharge-passage, F, through it, and is smooth on its upper surface, excepting that a raised rim, $h$, surrounds the central passage, $i$, which is formed to allow the blast to circulate through the machine and to admit the shaft B to extend up the proper distance. A passage, $j$, with spider-bearing, is formed through the upper head of the cylinder for the same purpose. Within the cylinder, and upon the shaft B, a scourer, G', is suspended, so as to be free from frictional contact with the circumference and heads of the cylinder G. This scourer has a spider-bearing, $k$, at its base and top, and to the arms of these bearings angularly-corrugated rings $l$ are united, upon which angular wings $m$, which are slotted, as at $m'$, for a portion of their width, are fastened, the broadest portion of the wings being closed or unslotted and roughened by projections $g'$, as shown in Fig. 9. The wings have each two opposing tangential surfaces, $n\,o$, and are shaped, as at $p\,p$, so that the grain is retained momentarily at different points within the cylinder, and thus subjected to a thorough scouring operation and also to a blasting effect, instead of moving in an unbroken circle. On top of the wings a disk, $q$, with projecting knobs $g'$ on its upper surface, is mounted, so as to overhang the angle formed by the wings, and that its projecting knobs $g'$ shall work in scouring concert with the knobs $g'$ of the upper head of the cylinder.

Around the passage in the upper head of the cylinder G a funnel, I, is placed. Within this funnel a vertical tube, J, with conducting-spout J' and valve J², is arranged. This tube leads up into the suction-spout K, which surmounts the machine in the form of an arch, and extends down to near the base of the same on two sides. The part of the spout in which the chaff, dust, light grain, and chess are drawn is provided with a door, L, a reversible valve, M, a regulating-valve, N, and a discharge-valve, K', as shown.

To one side of the frame A, on a bracket, O, a vertical adjustable rod, P, is pivoted at P', said rod having a series of holes for the pivot P', so that it may be raised and lowered. The lower end of this rod is fastened to a horizontal bar, Q, which vibrates against a spiral spring, R, on a rod, S, the vibration being produced by an eccentric, T, on the lower end of the shaft B.

To the upper end of the rod P and the top of a forked spring, S', two separator-shoes, U V, jointed and connected together by hinges $u$, and slotted connecting-rods W W are hinged, as at $r$, so that the shoes may vibrate in the direction of their length. The shoe V has its bottom board or plate fluted or ribbed longitudinally, as shown at V', so as to distribute and conduct the grain uniformly over the perforated plate of the shoe V, which shoe has a spout, $s$, at its rear end and two spouts, $t\ t'$, at its front end. The hinges and slotted connecting-rods of the shoes afford facilities for inclining the shoe U more or less relatively to the shoe V, while the holes in the rod P regulate the length of vibration of the shoes.

In order that the dust or smut and other substances escaping through the perforations of the cylinder may be confined and conducted into the fan-case, a casing or closed jacket, W, is placed around the perforated cylinder.

Operation of the machine: The grain is delivered on the upper end of the shoe V, which has a very quick end motion, instead of the usual side motion. The grain passes freely through the perforated plate, while the oats, weeds, nails, and coarse matter pass over and are discharged on the outside of the machine through the spout $s$. The grain in its course is spread and delivered uniformly from the shoe U to shoe V, which nearly or completely separates the oats from the wheat. From this shoe the oats pass off by the spout $t$, while the grain passes by spout $t'$ into the spout J', thence into the hopper or funnel I, where it meets a strong up-current of air or blast. Thus smut-balls, loose dust, chaff, &c., are drawn out of the wheat before it enters the scourer or smutter G—a result of great importance. The grain enters the scourer in a partially-cleaned condition, and in its course is deprived, by the friction of the oval knobs $g'$, of fuzz and other impurities without being broken, and these impurities are acted upon by a free current of air, which enters at the outdoor ventilation-passages $c\ c$ and flows up through the bottom plate of the cylinder G and circulates through the slots $m$ of the wings. By this current these impurities are carried off through the perforated cylinder G in the jacket W and drawn down through the openings $E^2\ E^3$ into the fan-case, and therefrom discharged into the open air or into a proper receptacle. While this is proceeding the cleaned grain is passing down the spout E by opening F into the suction-spout K, where it meets a strong suction-blast and is perfectly deprived of all impurities. The light and imperfect grain, chess, &c., passing around through spout K is delivered at valve $K^2$. The dust, chaff, and worthless matter are drawn round the valve M into the fan-case through passage $b$, and are thence discharged out-of-doors. The screenings and offal from buckwheat can be thrown out-of-doors also, if desired, by reversing the position of the valve M, as illustrated in dotted lines, and thus directing them into the fan-case. By raising or lowering the valve N the blast can be regulated at the discretion of the miller. The grain is discharged at $K^3$ in a perfectly-cleaned state. It is evident that the suction by the fan in the spout K across the tube J causes an updraft through the machine, and owing to this air rushes in from outdoors through the passages $c\ c$ above the fan-case, while air is entering at the end $K^3$ of the spout K and passing round in the same down into the fan-case and out through the discharge C' of the same with foreign substances.

What I claim as my invention, and desire to secure by Letters Patent, is—

1. In combination with the surrounding perforated internally-ribbed cylinder G $g\ g'$, the angularly-corrugated scourer G $g'\ m\ m'\ n\ o\ p$, the whole constructed and operating substantially in the manner and for the purpose specified.

2. Arming the scourer G' and the vertical ribs $g$ and upper head of the cylinder G with oval-form projections $g'$, as described.

3. Providing for the uniform distribution of the grain in its passage from the shoe U to the shoe V by means of inclined distributing-channels or their equivalents on the bottom of the shoe U, substantially as described.

4. The combination of the slotted adjusting-rods W W and hinges $u\ u$, substantially as and for the purposes described.

5. The combination of the screening-shoes U and V with the slotted adjusting-rods W W and hinges $u\ u$, the whole arranged and operating substantially in the manner and for the purpose described.

C. McGINNISS.

Witnesses:
I. MALCOM,
ROBERT CLARKE.